United States Patent [19]

Calbo, Jr. et al.

[11] Patent Number: 5,023,367
[45] Date of Patent: Jun. 11, 1991

[54] LINEAR, LOW-MOLECULAR-WEIGHT POLYESTER-BASED POLYOL

[75] Inventors: Leonard J. Calbo, Jr., Bethel; Lawrence V. Gallacher, East Norwalk, both of Conn.

[73] Assignee: King Industries, Inc., Norwalk, Conn.

[21] Appl. No.: 355,158

[22] Filed: May 22, 1989

Related U.S. Application Data

[63] Continuation of Ser. No. 453,222, Dec. 27, 1982, Pat. No. 4,902,821.

[51] Int. Cl.$^5$ .............................................. C07C 69/34
[52] U.S. Cl. ................................... 560/193; 525/425; 528/79
[58] Field of Search ........................................ 560/193

[56] References Cited

U.S. PATENT DOCUMENTS

| | | | |
|---|---|---|---|
| 4,000,214 | 12/1976 | Lum et al. | 528/79 |
| 4,018,848 | 4/1977 | Khanna | 528/79 |
| 4,119,762 | 10/1978 | Anderson et al. | 428/524 |
| 4,192,826 | 3/1980 | Bereniewicz et al. | 525/425 |
| 4,222,911 | 9/1980 | Christenson et al. | 528/79 X |
| 4,284,750 | 8/1981 | Amirsakis | 528/79 |

*Primary Examiner*—Jose G. Dees
*Assistant Examiner*—Vera C. Clarke
*Attorney, Agent, or Firm*—Hedman, Gibson, Costigan & Hoare

[57] ABSTRACT

This invention relates to a linear, low-molecular-weight polyester-based polyol having terminal primary hydroxyl groups, low viscosity, high solids content and having the structural formula:

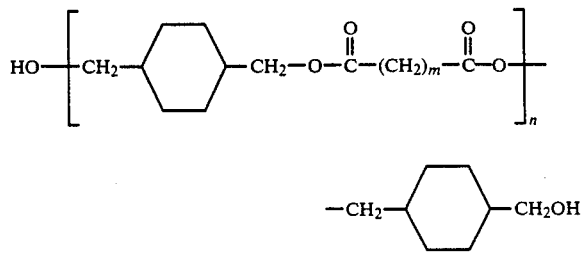

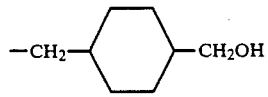

where n is 1 or 2 and at least 70% by weight is n=1, and m=2-10, said polyol being substantially free of cyclohexane dimethanol.

8 Claims, No Drawings

LINEAR, LOW-MOLECULAR-WEIGHT POLYESTER-BASED POLYOL

This application is a continuation of application Ser. No. 453,222, filed on Dec. 27, 1982, now U.S. Pat. No. 4,902,821.

BACKGROUND OF THE INVENTION

This invention is in the field of certain linear, low molecular weight polyester-based polyols having terminal primary hydroxy groups, comparatively low viscosities and comparatively high solids contents. This invention is also in the field of coating compositions containing these polyols with a cross-linking agent such as aminotriazine compounds and resins such as melamine-formaldehyde resins, urea-formaldehyde resins, epoxy resins, isocyanates or acrylic polymers containing reactive groups, such as hydroxyl groups, carboxyl groups, amide groups, amine groups and the like.

THE PRIOR ART

The instant applicants are aware of the following U.S. Pat. Nos. 4,018,848; 4,119,762; 4,192,826; 4,222,911; and British 1,561,076, all of which patents are incorporated herein by reference.

DESCRIPTION OF THE INVENTION

This invention relates to a linear, low-molecular weight polyester-based polyol having terminal primary hydroxy groups, comparatively low viscosity and a comparatively high solids content. The invention also relates to a process for the preparation of said polyol. The polyols of the present invention can be prepared by transesterifying a mixture of the alkyl esters of aliphatic dibasic acids or esterifying a mixture of the acids. It is preferred to start with the methyl esters of adipic, glutaric and succinic acids, although other lower alkyl esters could be used, such as the ethyl, propyl and butyl esters and the like, but cost factors generally remove them from consideration and nothing of value is to be gained by their use. Furthermore, this mixture of methyl esters is available commercially and is therefore additionally preferred, for this reason. These methyl esters, as available commercially, have a mole ratio of about 0.5:1.5:0.6, dimethyl adipate, dimethyl glutarate and dimethyl succinate respectively. Variations of this mole ratio can be tolerated depending upon the desired properties of the final product. Lower viscosities are obtainable with higher levels of glutarate, for example. Nor is it necessarily limited to a mixture of the three esters. It is also possible to use mixtures of only two dibasic esters or a single dibasic ester if desired. The same would apply to the dibasic acids as well, mixtures of the acids or single compounds being acceptable. Dibasic acids that are acceptable are succinic, glutaric, adipic, pimelic, suberic, azelaic and sebacic and higher homologs or mixtures thereof.

These methyl esters, sometimes referred to as dibasic esters or DBE for brevity, are mixed with a diol or triol containing at least two primary hydroxyl groups. The preferred diol is cyclohexane dimethanol, CHDM. Examples of other diols and triols with primary hydroxyls that could be used include neopentyl glycol; 1,4-butanediol; 1,6-hexanediol; 1,2,6-hexanetriol; trimethylol ethane; trimethylol propane; ethylene glycol; diethylene glycol; dimethylolpropionic acid; and 2,2-dimethyl-3-hydroxypropyl-2,2-dimethyl-3-hydroxypropionate and the like. Diols with a mixture of primary and secondary hydroxyls are less desirable, but may be used, and include propylene glycol and 1,2-hexylene glycol. Mixtures of diols may also be used.

Usually a catalyst is employed for the esterification/transesterification reaction for the purpose of lowering reaction temperatures and reducing color development in the product. Typical catalysts that may be employed are the alkoxides of titanium, soluble tin compounds such as dibutyl tin dilaurate and soluble manganese compounds such as $Mn(OAc)_2$. Catalyst levels of 0.005 to 1.0% by weight can be used with typical levels of 0.01 to 0.1% on the same basis.

In the preferred embodiment, the mixed methyl esters are combined with CHDM in a suitable reaction vessel and heated in the presence of a conventional transesterification catalyst, such as a titanium alkoxide, in order to accomplish transesterification. The methanol is split off during the heating step and is easily removed as free methanol until the new reaction product is devoid of or substantially completely free of methanol. The resultant product will contain, as a general rule, some varying amounts of unreacted cyclohexane dimethanol depending on the initial mole ratio of the reactants and the technique used to remove the cyclohexane dimethanol. The initial starting mole ratios of the dimethyl esters, also referred to as dibasic esters, considered as a whole and as one entity, to the cyclohexane dimethanol can be varied between about 1.0:1.5 and 1.0:10.0 respectively but preferably between about 1.0:2.0 and 1.0:4.0 respectively.

The ultimately produced polyol will be devoid of or substantially completely free of any cyclohexane dimethanol. The expressions devoid of or substantially completely free of means less than about 12% and preferably less than about 4% by weight based on the total weight of the final polyol reaction product.

The conventional technique used to remove the unreacted diol is batch distillation. The preferred technique uses continuous rapid stripping of the CHDM immediately followed by cooling the product to prevent chemical reaction and equilibration. Continuous large-scale rapid stripping can be accomplished using several processes including continuous column distillation, shell-and-tube evaporators and falling-film evaporator-strippers, to name several examples. It is conceivable that other techniques could be applied to remove excess diol, including liquid-liquid extraction or crystallization.

A useful laboratory technique to demonstrate the importance of rapid stripping and immediate cooling utilizes a rotary evaporator and an oil bath. The charge is a mole ratio of 1:3, dibasic acid to cyclohexane dimethanol transesterification product into the rotary evaporator at an absolute pressure of 1–2 Torr and an oil bath temperature of 180°–185° C. for eight minutes. 43% of the charge is volatilized and the resultant product has a viscosity of 13,800 cps at 25° C. and a 60 minute solids content of 98.8%.

If one were to use the batch distillation technique one experiences high viscosity and low solids content. The reason for these adverse results may be caused by the product equilibrating chemically toward the most probable component distribution during the slow batch distillation. Actually, batch polyesterification and transesterification reactions such as this normally lead to equilibrium product distributions dictated by simple statistical considerations. Therefore, a batch distillation of a high glycol-to-acid polyol to a lower glycol/acid mole ratio may tend to give the same equilibrium product one would obtain by running the whole transesterification reaction at the final mole ratio.

Surprisingly, it was found that rapid stripping of a 3:1 mole-ratio CHDM:DBE polyester polyol feed using a wiped-film evaporator followed by rapid cooling removed approximately 35% of the total weight of feed as CHDM and gave products which combined both low viscosity, on the order of 10,000 cps at 25° C., and high solids content, on the order of 98%. In contrast, conventional batch distillation removing the same weight of CHDM with or without rapid-cooling gives products with much higher viscosities, on the order of 18,000 cps or higher at 25° C., and lower solids content, on the order of 90%. These properties are extremely important in the formulation, application, and performance of high-solids coatings, as will be shown elsewhere in this application.

In principal, the same technique is applicable to other ester polyols as well. The maximum positive effect is achievable when all of the reactive groups have equal chemical reactivity. Thus, a diol with one primary and one secondary hydroxyl group will naturally yield a diester high in secondary hydroxyls, because the primaries will have reacted first to form the diester. Further, it will be much harder to get chain extension once one has diester, since the secondary hydroxyl end groups are not very reactive. In a case like this, one would be able to get a good yield of diester starting with a low diol:acid ratio, not much over 2:1. Following the same line of reasoning, one should be able to remove excess diol molecules easily without significant chain extension, so it should be possible to get extremely high solids.

In one embodiment, a wiped-film evaporator is used to accomplish the rapid stripping of the CHDM.

A wiped-film evaporator, such as the Artisan Rototherm ® thin-film evaporator consists of a heated cylindrical chamber with a feed inlet at the top above a rotatable heated cylindrical member or drum onto which the feed flows. A top exit is provided for the CHDM vapor to escape. An outlet is provided at the bottom from which the desired polyol product emerges. The rotatable drum is attached to an electric motor which provides the rotation. The temperature of the heated film is about 350° F. and the absolute pressure is about 2 mm. The residence time of the material being treated varies from about 30 seconds to 2 minutes. The product leaving at the outlet passes through a heat-exchanger which cools it to approximately 200° F. before it flows into the product storage vessel.

The polyols of the present invention can be used as coating compositions without modification when combined with any one or more of a host of crosslinking agents such as polyisocyanates or aminotriazine-aldehydes such as the melamine formaldehyde resins as shown in the U.S. Pat. No. 2,197,357 or the urea-formaldehyde resins and the like. One can also use the acrylic copolymers containing alcoholic hydroxy groups, with or without other reactive groups such as carboxyl groups, amide groups, amine groups and the like as shown in the U.S. Pat. Nos. 3,663,389, 3,894,993 and 3,945,961. These patents are incorporated herein by reference.

Other conventional additives may also be used such as pigments, catalysts and the like.

In order that the concept of the present invention may be more completely understood, the following examples are set forth in which all parts are parts by weight unless otherwise indicated. These examples are set forth primarily for the purpose of illustration and any specific enumeration of detail contained herein should not be interpreted as a limitation on the case except as is indicated in the appended claims.

EXAMPLE 1

Into a suitable glass reactor, the following ingredients were charged:
98.27 parts CHDM (309.6 moles)
7.37 parts DBE (20.9 moles)
Using a mantle, the contents of the reactor were heated to 125° C. with agitation, and then 12.3 parts of titanium tetrabutoxide were added. Heating was continued while a nitrogen flow of 100 ml/min. into the reactor was maintained. When the temperature reached 160° C., the temperature was maintained at that level, and 29 parts of DBE (82.2 moles) were then metered into the reactor over a 3 hour period with continuous agitation. During the DBE addition period, methanol vapor was evolved continuously and condensed with a water-cooled glass condenser to recover 7.4 parts of liquid methanol.

This product was then processed in a ¼ square foot Artisan Rototherm wiped-film evaporator. The feed rate was set at 19 ml per minute with a product outlet temperature of 175° C. at a pressure of approximately 1 Torr. The product was passed through a cooled outlet pipe to adjust the final product temperature to 95° C. The finished product had a viscosity of 9000 cps at 25° C. and showed 98% solids content in a one hour test.

The following examples are illustrative of the utility of the present invention:

EXAMPLE 2

A coating compostion is prepared by mixing the following ingredients:

| Formulation | Parts |
|---|---|
| Polyol from Example 1 | 60 |
| Hexakis (methoxymethyl) melamine[1] | 40 |
| n-Butanol | 10 |
| Flow control agent[2] | 0.4 |
| Acid catalyst[3] | 2 |
| % Solids = 89.5 | |
| Viscosity = 880 cps | |

[1] Cymel 303, American Cyanamid Company
[2] 3 M Co. (a fluorocarbon)
[3] King Industries, Inc. - DNNDSA The coating is applied by draw down bar to yield approximately 1 mil film thickness on a phosphate treated steel panel which is then placed in a forced draft convection oven and cured under the following several conditions of varying time and temperature:

| Time, min. | 20 | 15 | 10 | 5 |
|---|---|---|---|---|
| Temp, °F. | 200 | 225 | 250 | 275 |
| Pencil Hardness | H-2H | H-2H | H-2H | H-2H |
| Double MEK Rubs | 100 | 100 | 100 | 100 |
| Reverse Impact, in. lb. | 80+ | 80+ | 80+ | 80 |

EXAMPLE 3

The following example illustrates the improved coating properties that result when a polyol of the present invention is used as a minor component of the binder system.

The ingredient listed below are blended in a suitable container.

| Formulation | 1 | 2 | 3 |
|---|---|---|---|
| Acrylic Resin[1] | 200 | 280 | 240 |
| Hexakis(methoxymethyl)melamine[2] | 25 | 50 | 60 |
| Polyol of Example 1 | — | 10 | 20 |
| Isopropanol | 25 | 42 | 44 |
| Xylene | — | 18 | 36 |
| DNNDSA[3] Amine Blocked Catalyst | 2.5 | 4.0 | 4.0 |
| Acrylic/Mel/Polyol Ratio | 80/20/— | 70/25/5 | 60/30/10 |

[1]Rohm & Haas Co.
[2]Cymel 303, American Cyanamid Co.
[3]King Industries, Inc.

The coating mix is applied by draw down bar to iron phosphated cold rolled steel and cured for 20 min. at 150° C. in a forced draft convection oven. The properties are set forth hereinbelow.

| | 1 | 2 | 3 |
|---|---|---|---|
| Pencil Hardness | 2–3H | 4–5H | 2–3H |
| Double MEK Rubs | 100+ | 100+ | 100+ |
| Adhesion Loss, % | 0 | 0 | 0 |
| Impact, reverse | 30–40 | 80+ | 80+ |
| direct | 80+ | 80+ | 70/80 |
| Water Immersion 250 hr, 50° C. Blister Rating | Few 8 | Very Few 8 | Very Few 8 |

EXAMPLE 4

In this example a pigmented enamel is prepared by grinding titanium dioxide in a polyol of the present invention. The enamel thus prepared has very high solids and excellent low temperature cure properties as illustrated hereinbelow.

| Mix in a suitable container: | |
|---|---|
| Titanium dioxide | 550 parts |
| Polyol of Example 1 | 250 |
| n-Butanol | 75 |
| Cellosolve Acetate | 125 |
| Disperse on Cowles Dissolver | |
| Let Down | |
| Acrylic resin[1] | 333 |
| Hexakis(methoxylmethyl)melamine[2] | 200 |
| n-Butanol | 30 |
| % Solids, wt. | 80 |
| Viscosity, cps | 440 |
| Polyol/Acrylic/Mel | 50/50/40 |

| Film Properties White Enamel | | | |
|---|---|---|---|
| Cure: | | | |
| Time, min. | 15 | 15 | 30 |
| Temp. °C. | 121 | 93 | 82 |
| Catalyst: | | | |
| DNNDSA, % TRS | 0.6 | 2.0 | 2.75 |
| Pencil Hardness | 2–3H | H–2H | H–2H |
| MEK Rubs | 200 | 200 | 170 |
| Reverse Imp. | 80+ | 80+ | 80+ |
| Gloss, 60° | 89 | 91 | 91 |
| Water Immersion 250 hr., 50° C. | | | |
| Gloss, 60° | 89 | 90 | 86 |

TRS = Total Resin Solids
[1]King Industries
[2]Cymel 303, American Cyanamid Co.

EXAMPLE 5

A room temperature curing coating composition is prepared by mixing the polyol of Example 1 with an isocyanate crosslinking agent in the manner described below.

| Components | Parts |
|---|---|
| Polyol of Example 1 | 100 |
| Polyisocyanate[1] | 82 |
| Xylene | 30 |
| 2-Ethoxyethyl acetate | 30 |
| % Solids = 75 | |
| Viscosity = 60 sec. Ford 4 Cup | |

The coating may be either sprayed or applied by draw down bar to a steel panel with the resultant film properties.

| After 24 hr aging of the coated panel at room temperature: | |
|---|---|
| Pencil Hardness | 5–6H |
| MEK Rubs | 200 |
| Impact, reverse | 160 in. lb. |
| direct | 160 in. lb. |

[1]Mobay Chemical Corp.

Coating is tack-free after 6 hours.

In the polyols of the present invention, the amount of the bracketed moiety, when n is 1 or 2, is at least 70% by weight when m is 2 to 10 inclusive. It is preferred that such moiety is sufficient to provide a weight average molecular weight of between about 300 and 600 and preferably between about 350 and 500. The final reacted mole ratio of the dibasic acid to the cyclohexane dimethanol is between about 1.0:1.7 and 1.0:2.3 respectively.

The process of the present invention requires a stripping temperature of from about 150° C. to 225° C. at an absolute pressure of from about 0.05 to 100 Torr for a period of time from about 10 seconds to 10 minutes.

It is preferred to use a temperature from about 160° C. to 210° C. and at an absolute pressure of from about 0.1 to 2.00 Torr and for a period of time from about 20 seconds to about 2 minutes.

We claim:

1. A linear, low molecular weight, polyester-based polyol having terminal primary hydroxyl groups, low viscosity, high solids content and having the structural formula:

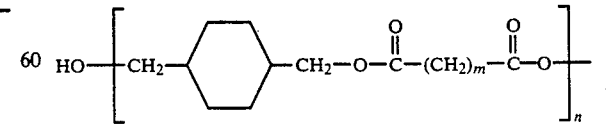

where n is 1 or 2 and at least 70% by weight is n=1; and m=2-10 said polyol having less than 4% by weight based on total weight of the final polyol reaction product of cyclohexane dimethanol.

2. The polyol according to claim 1 in which the mole ratio of the dibasic acid to the cyclohexane dimethanol is between about 1.0:1.7 and 1.0:2.3 respectively.

3. The polyol according to claim 1 in which the weight average molecular weight is between about 300 and 600.

4. The polyol according to claim 1 in which the weight average molecular weight is between about 350 and 500.

5. A linear, low-molecular-weight polyester based polyol having terminal primary hydroxyl groups, low viscosity, high solids content and having the structural formula:

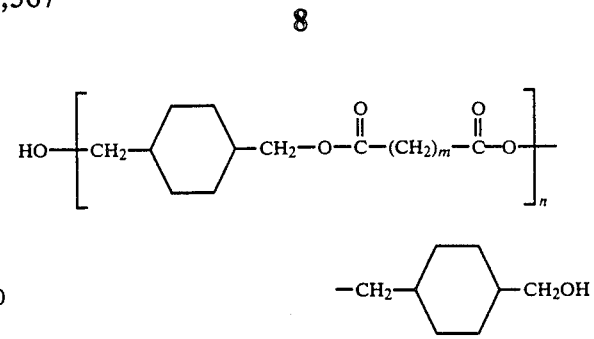

where n is 1 or 2 and at leat 70% by weight is n=1; and m=2-4, said polyol having less than 4% by weight based on total weight of the final polyol reaction product of cyclohexane dimethanol.

6. The polyol according to claim 5 in which the mole ratio of the dibasic acid to the cyclohexane dimethanol is between about 1.0:1.7 and 1.0:2.3 respectively.

7. The polyol according to claim 5 in which the weight average molecular weight is between about 300 and 600.

8. The polyol according to claim 5 in which the weight average molecular weight is between 350 and 500.

* * * * *